(12) United States Patent
Benke et al.

(10) Patent No.: US 11,176,119 B2
(45) Date of Patent: Nov. 16, 2021

(54) DATABASE RECOVERY USING PERSISTENT ADDRESS SPACES

(71) Applicant: International Business Machines Corporation, Armonk, NY (US)

(72) Inventors: Oliver Benke, Stuttgart (DE); Roland Seiffert, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 16/586,009

(22) Filed: Sep. 27, 2019

(65) Prior Publication Data
US 2020/0026698 A1 Jan. 23, 2020

Related U.S. Application Data

(63) Continuation of application No. 15/671,896, filed on Aug. 8, 2017, now Pat. No. 10,579,613.

(51) Int. Cl.
*G06F 17/00* (2019.01)
*G06F 16/23* (2019.01)
*G06F 16/25* (2019.01)
*G06F 16/28* (2019.01)

(52) U.S. Cl.
CPC ...... *G06F 16/2365* (2019.01); *G06F 16/2379* (2019.01); *G06F 16/254* (2019.01); *G06F 16/284* (2019.01)

(58) Field of Classification Search
CPC ........ G06F 16/13; G06F 16/24; G06F 16/156; G06F 16/254; G06F 16/1446; G06F 11/00; G06N 3/00; G06N 5/00; G05B 13/00
See application file for complete search history.

(56) References Cited

U.S. PATENT DOCUMENTS

| 7,711,713 | B2 | 5/2010 | Cherkauer et al. |
| 7,793,149 | B2 * | 9/2010 | Mall .................. G06F 11/0793 714/15 |
| 8,180,745 | B2 | 5/2012 | Suvernev et al. |
| 8,429,134 | B2 | 4/2013 | Chan |
| 9,223,554 | B1 * | 12/2015 | Lawson .................... G06F 8/54 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

(Continued)

*Primary Examiner* — Hung D Le
(74) *Attorney, Agent, or Firm* — Heslin Rothenberg Farley & Mesiti P.C.; Steven Chiu, Esq.

(57) ABSTRACT

A processor(s) initiates a database transaction, in a computing environment that includes a database that includes one or more memory devices. The processor(s) forks a first address space that represents a current state of the database, to create a second address space. The processor(s) writes an entry indicating timing of the initiating to a log file and generates a file that is mapped to the one or more memory devices. The file includes differences in state between the current state of the database and a state subsequent to executing and committing the database transaction, and a timestamp indicating timing for committing the database transaction. The processor(s) write the database transaction to the second address space.

20 Claims, 9 Drawing Sheets

(56) References Cited

U.S. PATENT DOCUMENTS

| | | | |
|---|---|---|---|
| 9,348,831 B1 | 5/2016 | McCline et al. | |
| 9,424,286 B2 | 8/2016 | Dhamankar et al. | |
| 9,519,551 B2 | 12/2016 | Larson et al. | |
| 10,191,670 B2* | 1/2019 | Xi | G06F 3/0673 |
| 2009/0276662 A1 | 11/2009 | Shen et al. | |
| 2012/0233396 A1* | 9/2012 | Flynn | G06F 12/1081 |
| | | | 711/108 |
| 2012/0254120 A1 | 10/2012 | Fang et al. | |
| 2015/0378630 A1* | 12/2015 | Xi | G06F 11/167 |
| | | | 711/162 |
| 2016/0203053 A1* | 7/2016 | Talagala | G06F 3/0683 |
| | | | 714/6.12 |
| 2019/0050442 A1 | 2/2019 | Benke et al. | |
| 2019/0050444 A1 | 2/2019 | Benke et al. | |

OTHER PUBLICATIONS

Volos et al., "Mnemosyne: Lightweight Persistent Memory", 13 pages, http://dl.acm.org/citation.cfm?id=1950379.

Malviya et al., "Rethinking Main Memory OLTP Recovery", 12 pages, http://ieeexplore.ieee.org/abstract/document/6816685/.

Lindstrom et al., "IBM solid DB: In-Memory Database Optimized for Extreme Speed and Availability", 7 pages, http://sites.computer.org/debull/A13june/soliddb1.pdf.

List of IBM Patents or Patent Applications Treated as Related, Oct. 23, 2019, 2 pages.

* cited by examiner

DATABASE RECOVERY USING PERSISTENT ADDRESS SPACES

BACKGROUND

For ACID (Atomicity, Consistency, Isolation, Durability) transaction semantics in (relational) databases, with UNDO/REDO information stored in BEFORE/AFTER images for atomicity (i.e., rollback capability) and durability, it is often problematic to process mass updates to the database as needed for ELT/ETL (Extract, Transform, Load) processes or for a re-load into an accelerator. Because writing log information can cause significant overhead, among other issues, especially if many write operations are outstanding, performing COMMITs frequently is recommended, which can affect the efficiency of the database.

SUMMARY

Shortcomings of the prior art are overcome and additional advantages are provided through the provision of a method of processing a transaction in a database. The method includes, for instance: initiating, by one or more processors, a database transaction, in a computing environment comprising a database comprising one or more memory devices, wherein the initiating comprises: forking, by the one or more processors, a first address space, wherein the first address space is an address space representing a current space of the database, to create a second address space; writing, by the one or more processors, an entry indicating timing of the initiating to a log file; and generating, by the one or more processors, a file, wherein the file is mapped to the one or more memory devices, the file mapping a state of the database comprising one or more temporary modifications implemented by the database transaction and a timestamp indicating timing for committing the database transaction; and writing, by the one or more processors, the database transaction to the second address space.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
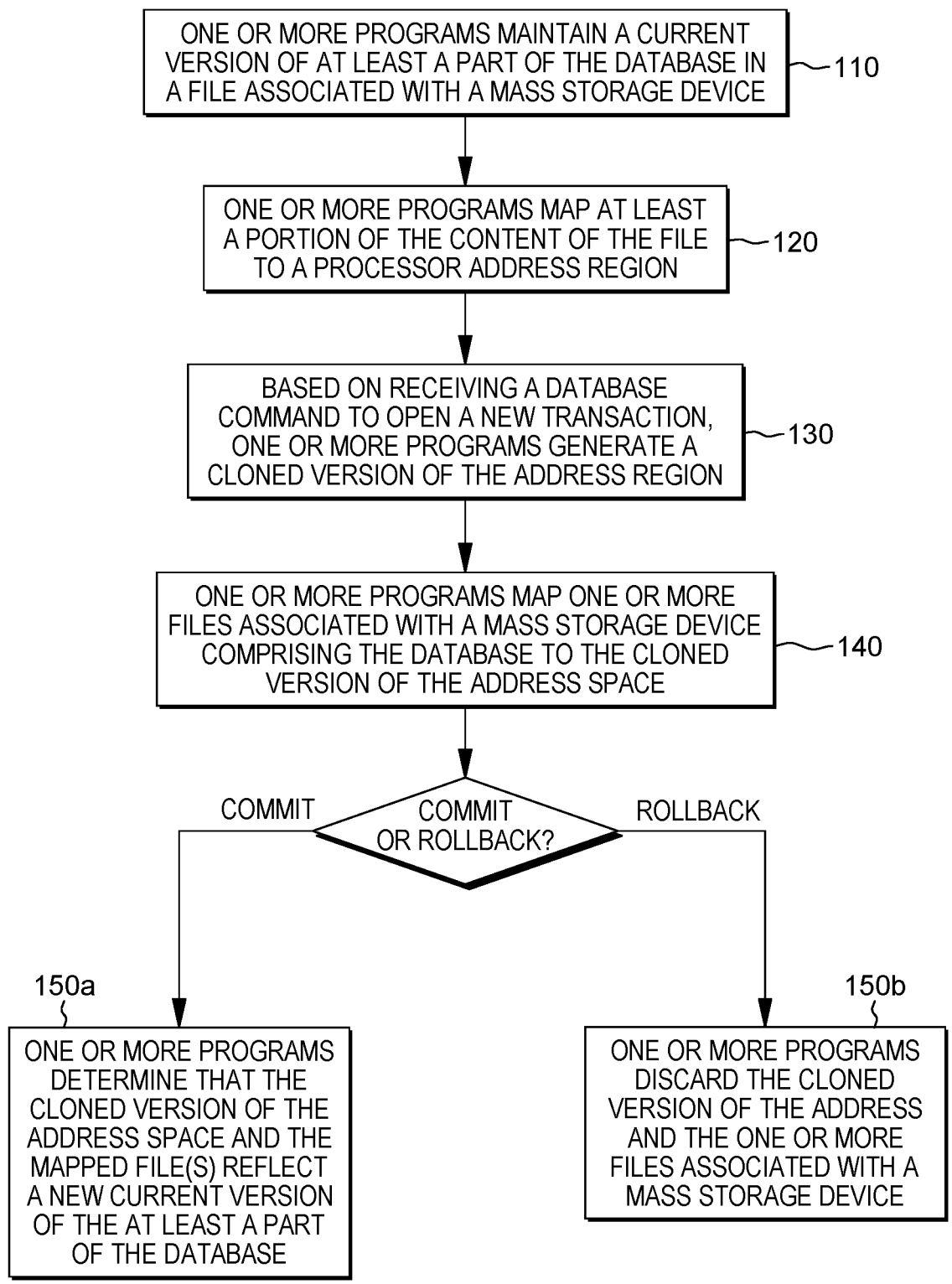
FIG. 1 depicts a workflow that includes various aspects of a data request in some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
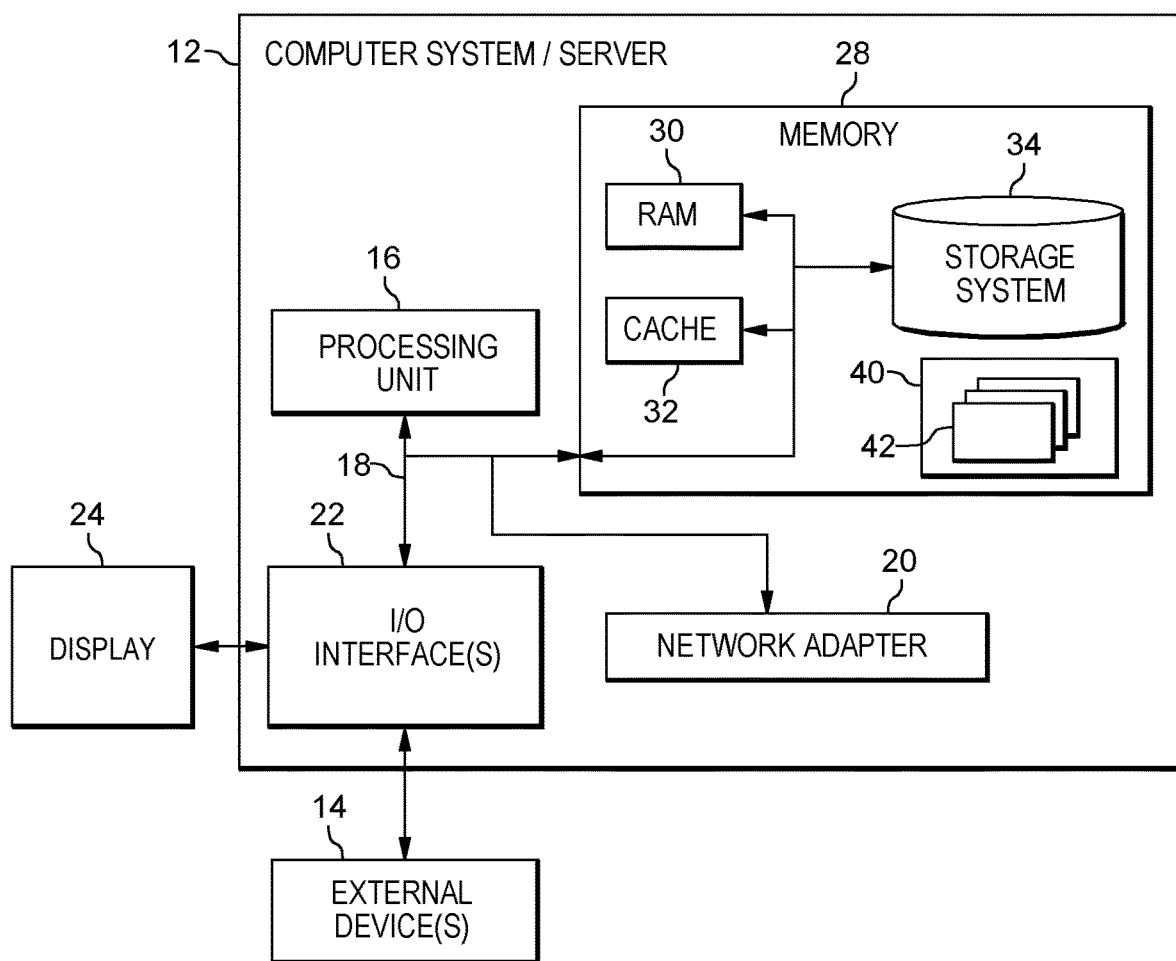
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

Embodiments of the present invention include a method, a system, and a computer program product that enable one or more programs executing on one or more processors to process a database transaction. The disclosed method of processing enabled by the method, computer program product, and system provides certain advantages over current processing systems and methods. Some advantages of embodiments of the present invention are the elimination of certain processes that can stall efficiency and compromise data integrity, while others represent the introduction of functionality that is not available in current systems. The new functionality positively impacts the efficiency and efficacy of the database.

Some embodiments of the present invention improve processing by eliminating current realities that hinder efficiency and efficacy in current systems. For example, in current database systems, if maintaining data consistency and serializability are required, and this accomplished by using lock-based methods, the scalability of the database system is significantly reduced. This reality is experienced, for example, when a long-running transaction is holding a write lock. To maintain the aforementioned consistency and serializability, some current systems utilize multi-version concurrency control (MVCC) based mechanisms together with conflict detection, using directed graph traversal. When compared to embodiments of the present invention, these systems process transactions less efficiently because in these current systems, each read transaction is slightly slowed down due to MVCC related overhead caused by the fact that in order to figure out which parts of the data are valid at a certain point in time, all data has to be processed. An aspect of some embodiments of the present invention provides an advantage (e.g., when processing business-analytics-related workloads) over these current systems in that, in these embodiments, no locking/serialization effects/scalability limits are introduced and all transactions can be processed at full speed, as if no concurrency control logic is in place.

Some embodiments of the present invention also provide advantages over the logical unit of work (LUW) implementations in current system. For example, in these current systems, customers are forced, for technical reasons, to commit frequently, rather than because the business logic of transaction processing dictates the commits, which can create high processing costs. The frequency of committing for technical reasons is because state-of-the-art relational databases using locking based concurrency control cannot handle with too many open transactions. An advantage of some embodiments of the present invention is the elimination of the frequency requirement for committing transactions, without compromising performance or data integrity.

Some embodiments of the present invention improve transaction processing in databases by providing aspects that are not available in current systems. For example, not only do certain embodiments of the present invention provide trivial backups, where the program code duplicates just the latest file, embodiments of the present invention also provide trivial recoveries, where the program code reads just the latest file to restore the database to a desired state. Additionally, some embodiments of the present invention provide ease in adding replication with minimal delay and high efficiency. Another advantageous aspect of certain embodiments of the present invention is the introduction of what can be understood as a temporary Extract, Load, Transform, (ELT) functionality. In general, ELT, which is a variation of Extract, Transform, Load (ETL), allows raw data to be loaded directly into a target and transformed there. In embodiments of the present invention, the temporary ELT aspect provides for an analyst to work on data, based on private snapshot of the enterprise database, performing all appropriate activities in-database. The program code can then discard the results of these activities and the private snapshot using ROLLBACK, after report creation is complete.

As will be understood from the description and figures, transaction processing in embodiments of the present invention has some commonalities as well as some differences when compared to current transactions processing technologies. For example, unlike many current methods, in some embodiments of the present invention, at every new write transaction, the program code either creates a new file and/or compresses the differences (i.e., deltas) in a special file system (e.g., FIGS. 3-5, memory mapped files 270 370 470), for performance optimization. Similar to standard MVCC processing, in some embodiments of the present invention, the program code utilizes groom processes to delete or discard outdated blocks. However, in embodiments of the present invention, the grooming process is simplified, when compared with current systems. As understood by one of skill in the art, program code executing a grooming process maintains the user tables by reclaiming disk space for deleted or outdated rows and reorganizes the tables by their organizing keys. Specifically, the program code processes and reorganizes table records in each data slice in a series of steps. Grooming deleted records removes records that were already logically deleted. Finally, some embodiments of the preset invention enable different database usage by maintaining all currently active versions in file-backed main memory, with copy-on-write (e.g., FIG. 4 address spaces 430c-430e). All versions that are not groomed are easily recoverable and/or available. Because not all versions are in-memory on all nodes, limitations may exist on options to use scale-out and/or cluster, if single-node memory capacity is a concern.

FIG. 1 provides a high level workflow 100 of certain aspects of some embodiments of the present invention. In general, aspects of embodiments of the present invention generate a memory-mapped address space with a clone (i.e., "fork") capability, which enables the memory and the disk of a database, which can be comprised of multiple computing nodes, to store tables, optionally together with index structures. Generally, forking is a functionality that is used to generate a duplicate of particular process by creating two simultaneous executing processes of a program. These two processes are typically called the "parent" and "child" processes. These processes then use multitasking protocols to share system resources. When forking is implemented, a copy-on-write system used to store progressive changes to a process after forking. Typically, static code is not duplicated, but shared. At the time that a process modifies shared code, the changes are created and stored separately in order to promote efficiency in the use of forked processes. Developers also have to be aware of some issues with using fork to generate a duplicate process. One of these is the issue of multithread programs; because the child process only inherits a single thread, there can be problems related to what happens to multiple threads when the fork function is called. These and other considerations are often mentioned by those who have worked with the fork function.

When one or more programs in the database receives a new read or write transaction, the one or more programs clone the address space, with copy-on-write timing and dirty pages, supported by the memory management unit (MMU) of the processor and by the operating system (OS). When the one or more programs receive a command to commit the transaction, the one or more programs close the database file and make the copy of the address space with the committed transaction the new master (as opposed to the cloned) address space. This newly minted master comprises a latest consistent state of the database.

As illustrated in FIG. 1, in embodiments of the present invention, in order to process a database transaction, one or more programs, executing on one or more processors, maintain a current version of at least a part of the database in a file associated with a mass storage device (110).

The one or more programs map at least a portion of the content of the file to a processor address region of a processor(s) (120). Based on receiving a database command to open a new transaction, the one or more programs generate a cloned (i.e., "forked") version of the address region (130). The one or more programs manage the cloned version of the address space according to a copy-on-write strategy. The one or more programs write operations belonging to the transaction on this cloned version of the address space. In some embodiments of the present invention, as part of establishing the cloned version of the address region, the one or more programs map one or more files associated with a mass storage device comprising the database to the cloned version of the address space (140). The files map the current state of the database, including all temporary modifications done by transactions owning the persistent address space. Each mapped file represents the database space from given transaction's perspective (with the file making that address space persistent). In some embodiments of the present invention, there is one memory mapped file with directly associated memory contents for every new write transaction.

Depending upon commands received, the fate of the cloned version changes. Based on receiving a command to commit the transaction, the one or more programs determine that the cloned version of the address space and the mapped file(s) and the one or more files associated with a mass storage device, reflect a new current version of the at least a part of the database (150a). Meanwhile, based on receiving a command to roll back the transaction, the one or more programs discard the cloned version of the address and the one or more files associated with a mass storage device (150b).

Figure 2:
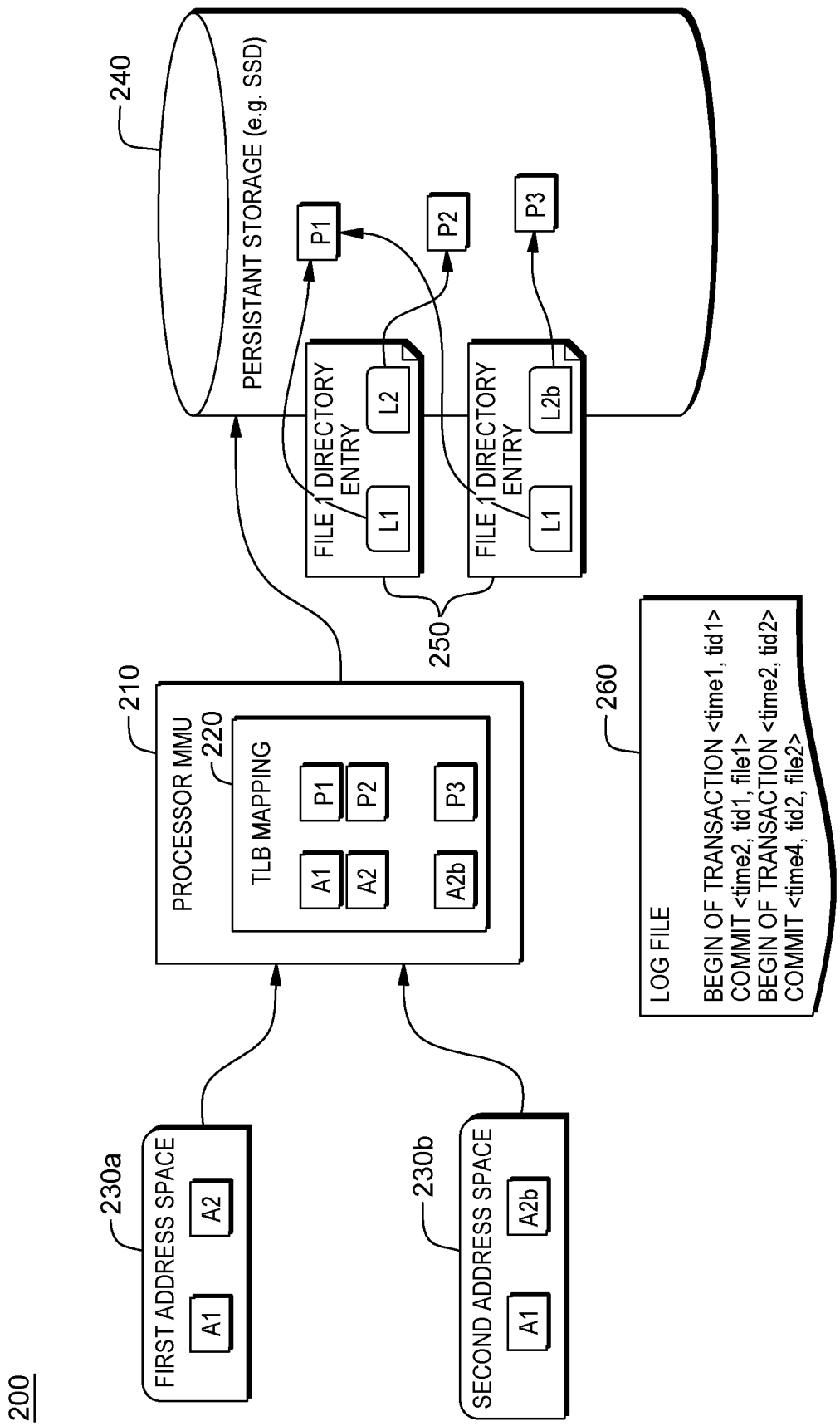
FIG. 2 illustrates a technical architecture of a computing system where certain aspects of embodiments of the present invention may be implemented.

FIG. 2 is an overview of an example of a technical architecture 200 into which certain aspects of some embodiments of the present invention may be implemented. The architecture 200 includes an MMU of a processor 210 that includes a translation lookaside buffer (TLB) 220 that maps addresses that represent memory areas where contents are absolutely placed (e.g., A1, A2, A2b) to placements in sections and blocks of a particular memory regions, persistent address spaces (e.g., P1, P2, P3). In general, an MMU 210 maps a logical address to a physical address. The MMU 210 is communicatively coupled to address spaces, in this example, a first address space 230a, and a second address space 230b.

As illustrated in FIG. 1, each address space includes addresses that represent memory areas where contents are absolutely placed. The first address space 230a, includes addresses A1 and A2. The second address space 230b, includes addresses A1 and A2b. A2b, is so-named as it is a backup copy on A2.

The MMU 210 is also communicatively coupled to persistent storage 240. As indicated in FIG. 1, persistent storage 240 may be, but in not limited to, a solid state drive. The persistent storage 240 is comprised of the particular memory regions (e.g., P1, P2, P3). Files with directory entries 250 indicate the lines (L1, L2, L2b) at which the physical addresses or memory regions (e.g., P1, P2, P3) addressed in the address spaces 230a 230b, are located. A log file 260 indicates the processing of a transaction by the technical architecture 200. As indicated in the log file 260 and the file directory entries 250 for file 1, file 1 is memory mapped to the persistent storage 240. As noted in the log file 260, a transaction is identified by an identifier (i.e., tid1). The program code commits the transaction (i.e., tid1) at a given time (i.e., time2), and a given (memory mapped) file (i.e., file1). Another transaction begins at another time (i.e., transaction=tid2, time=time3). The program code commits the next transaction (i.e., tid2) at another time (i.e., time4), with another file (i.e., file2).

Figure 3:
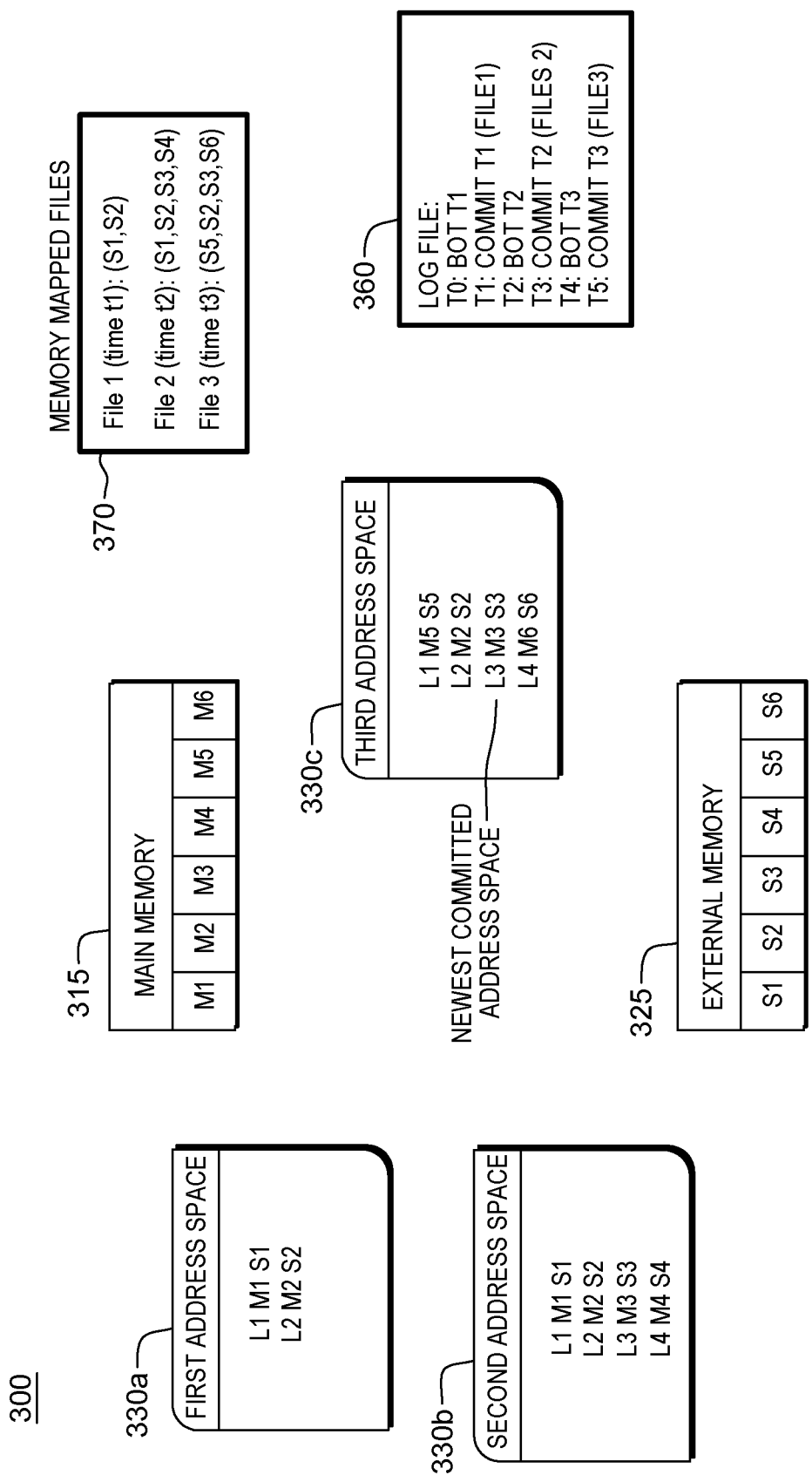
FIG. 3 illustrates a snapshot in a technical environment in which aspects of some embodiments of the present invention have been implemented.
Figure 4:
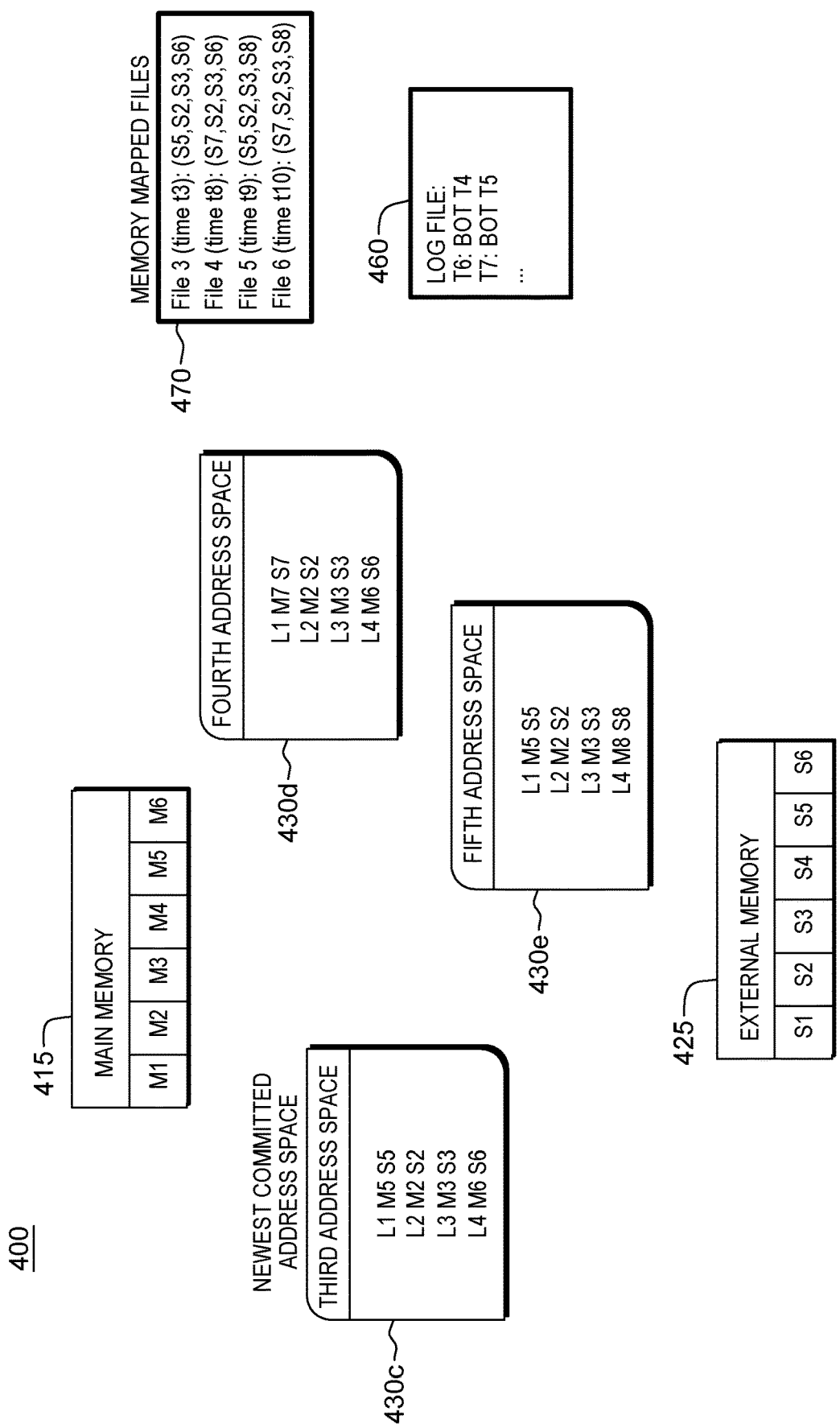
FIG. 4 illustrates a snapshot in a technical environment in which aspects of some embodiments of the present invention have been implemented.
Figure 5:
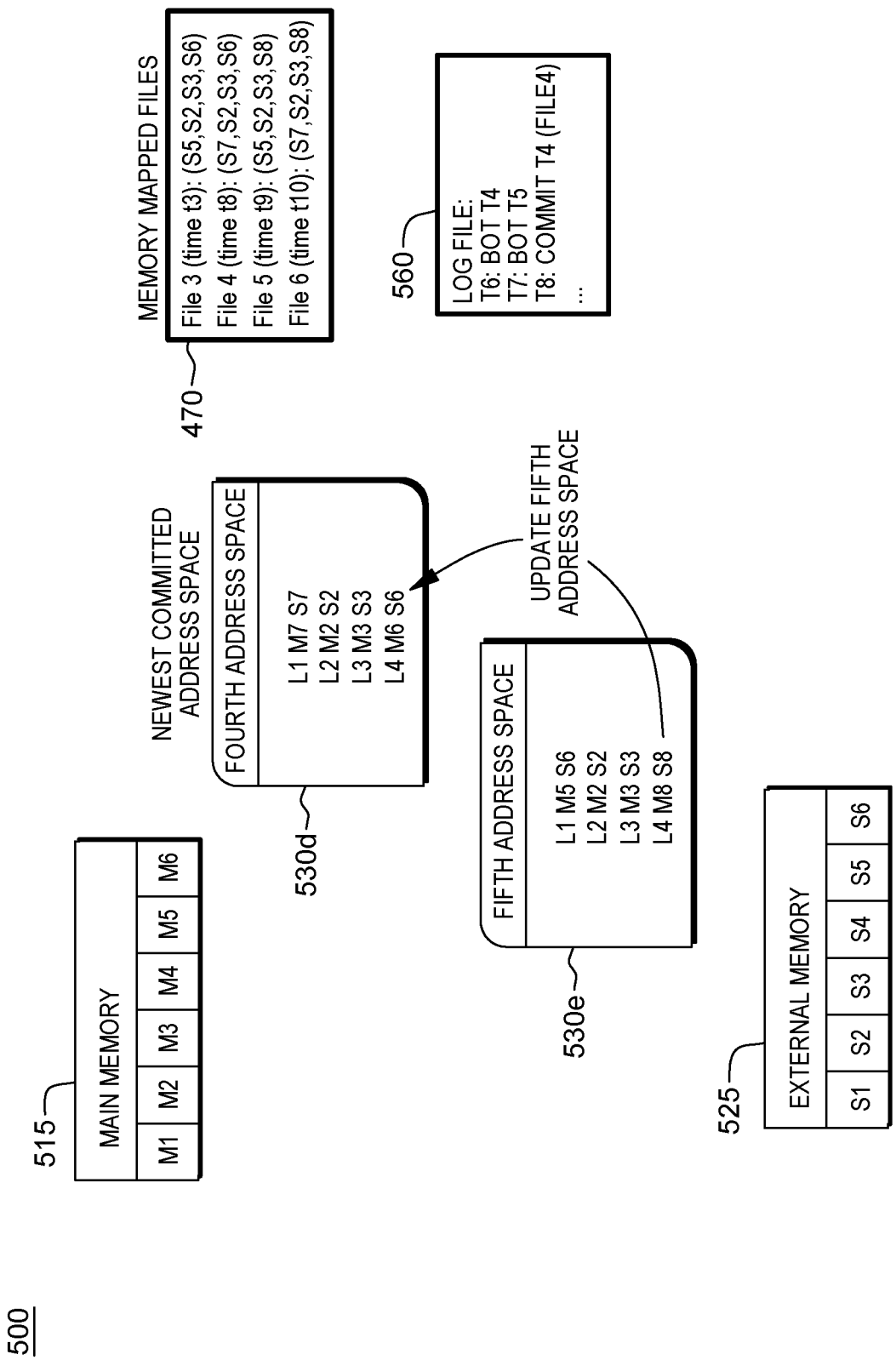
FIG. 5 illustrates a snapshot in a technical environment in which aspects of some embodiments of the present invention have been implemented.

FIGS. 3-5 show the progression of transactions that are processed in accordance with aspects of some embodiments of the present invention, when contrasted with transactions that are processed using current methods. The limitations in this environment, including, the number of memory modules, segments, address spaces, etc., are offered merely for illustrative purposes and do not represent limitations to technical architectures into which aspects of the present invention may be implemented.

FIG. 3 illustrates a snapshot 300 of database transactions in a technical environment. Referring to FIG. 3, modules in a main memory 315 (i.e., M1, M2, M3, M4, and M5) and segments in the external memory 325 (i.e., S1, S2, S3, S4, S5, and S6), comprise portions of the addresses in the address spaces 330a 330b 330c. The addresses also include a line designation (i.e., L1, L2, L3, and L4). Thus, the format for a given address is "Lx Mx Sx" with an x being replaced by an integer identifying a memory portion. Three address spaces contain addresses, including a first address space 330a, a second address space 330b, and a third address space 330c. The third address space 330c is the newest committed address space.

In an aspect of some embodiments of the present transaction, the program code generates (and/or updates) at least one a memory mapped file 370 that represents each transaction. As illustrated in FIG. 3, when the program code starts a new read-write transaction, the program code appends a time stamp and a transaction number to a log file 360. For example, the first line of the log file 360 is "T0: BOT T1" (BOT=beginning of transaction). This line indicates that the program code started executing transaction T1 (i.e., opened transaction T1) at time t0/T0. Also as part of commencing a transaction, as will be described in more detail herein, the program code clones (forks) the address space that represents the latest commit state. The snapshot 300 of FIG. 3 represents a state where transactions T1, T2, and T3 have all been executed and committed. Thus, the program code has generated a memory mapped file 370 designating changes to address values that comprise each transaction, and time-stamped, in the log file 360, both executing and committing the transactions.

The log file 360 of FIG. 3 chronicles the transactions illustrated by the address spaces 330a 330b 330c. The third address space 330c in FIG. 3 is marked as the newest committed address space, because, as enumerated in the log file 360, and addressed in greater detail below, the contents of the first address space 330a and the second address space 330b were previously committed, at the time of the snapshot 300 that is FIG. 3.

Based on the log file 360, the program code has executed three transactions, T1, T2, and T3. At a time of t0, program code initiated/opened transaction T1 and generated the memory mapped file, File 1. At time t1, transaction T1, the program code committed T1. At time t2, the program code initiated transaction T2, and generated memory mapped file, File 2. At time t3, the program code committed transaction T2. At time t4, the program code initiated transaction T3, and at time t5, the program code committed transaction T3. At t3, the program code also generated the memory mapped file, File 3. Thus, as discussed relative to existing transaction processing methods, the program code initiates and then commits each transaction. Aspects of embodiments of the present invention eliminate the necessity of committing so frequently, which is further demonstrated in FIG. 4.

Returning to FIG. 3, the log file, and the first address space 330a include addresses for L1 and L2, the specifics of which are reproduced below.

L1 M1 S1
L2 M2 S2

The memory mapped file that coordinates with transaction T1, File 1, contains these values for S1 and S2. At time t1, the segments, as reflected in the first address space, for L1 and L2, are S1 and S2. In this example, the memory modules in the main memory 415 are logically coordinated with the segments, in the illustrative technical environment. Thus, when the segment for a line changes in an address, so does not module.

Upon commencement of transaction T2, the program code generated the memory mapped file File 2. The second address space 330b, created by the program code when executing transaction T2, includes lines in segments S1, S2, S3, and S4. When executing transaction T2, the program code cloned the first address space 330a, which at the time was the most current committed address space, to generate the second address space 330*b*. The memory mapped file for the transaction T2, indicates that in executing transaction T2, the program code added addresses referencing S3 and S4, to the second address space 330*b*. The program code updated made this addition/change to the cloned address space, the second address space 330*b*. The contents of the second address space 330*b*, based on the program code executing the transaction T2, are reproduced below:

L1 M1 S1
L2 M2 S2
L3 M3 S3
L4 M4 S4

At the time that the program code executed the third transaction T3, the second address space 330*b* was the most recently committed address space. As indicated in the log file 360, after initiating the transaction that generated the second address space 330*b*, the program code committed the second address space 330*b*. However, upon conclusion of the transaction executed in this figure, per the log file 360, the third address space 330*c*, is the newest committed address space, and includes lines in segments S5, S2, S3, and S6. As illustrated in the log file 360 and the transaction 370 details, the program code initiates transaction T3 to clone the second address space 330*b* and generates memory mapped File 3. The clones address space, the third address space 330*c*, which contains addresses on lines L1, L2, L3, and L4. The program code executes the transaction T3 and makes changes in the third address space 330*c*, updating certain values in the third address space 330*c*. Transaction T3 (as seen in memory mapped file, File 3), updates L1 and L4. The contents of the third address space 330*c* after T3 was executed are reproduced below:

L1 M5 S5
L2 M2 S2
L3 M3 S3
L4 M6 S6

The final action in the log file 360 is committing transaction T3. Thus, at the conclusion of the transactions in the log file 360, the third address space 330*c* is the newest committed address space, as designated in the snapshot 300.

Referring to FIG. 4, the snapshot 400 pictured, as seen in the log file 460, was taken after two additional transactions, T4 and T5, were executed by one or more processors, but no additional transactions were committed. In this snapshot 400, the third address space 430*c* (330*c* in FIG. 3), remains the newest committed address space. Unlike in FIG. 3, the third address space 430*c* is not the newest address space, but it is the newest address space that has been committed. As indicated in the log file 460, the program code executed but did not commit the transactions that generated the fourth address space 430*d* and the fifth address space 430*e* (i.e., transaction T4 and transaction T5). Thus, when initiating transaction T4 and transaction T5, the program code cloned (i.e., forked) the third address space 430*c* because the third address space 430*c* is the newest committed address space.

In FIG. 4, the program code generates the fourth address space 430*d* by initiating the transaction T4 and generating a memory mapped file, File 4. File 4, as seen in the transaction 470, includes references to segments S7, S2, S3, and S8, in that order. The timestamp on File 4 is t8, indicating timing for changes in this memory mapped file related to transaction to be relevant to the state of the database. The log file 460 indicates that the program code opened transaction T4, cloned the third address space 330*c*, wrote a memory mapped file, File 4, and in executing the transaction T4, updated the first address, the address starting with L1, with segment S7 (and the module M7). Below are the contents of the fourth address space 430*d* (a clone of the third address space 430*c*) after the program code has executed the transaction T4:

L1 M7 S7
L2 M2 S2
L3 M3 S3
L4 M6 S6

As seen in the log file 406, although the program code executed transaction T4 (i.e., BOT T4), the program code did not commit this transaction after execution. Thus, despite the third address space 430*c* having been cloned to create the fourth address space 430*d*, the third address space 430*c* is still the newest committed address space. Therefore, the program code will clone the third address space 430*c* when executing the next transaction, in this example, transaction T5.

In executing transaction T5, based on the third address space 430*c* being the newest committed address space, when executing transaction T5, the program code clones the third address space 430*c*, to generate the fifth address space 430*e*. As with the other transactions, as part of executing the transaction T5, the program code generates a memory mapped file, File 5. The program code executes the transactions, details of which are entered in File 5, which include the segment values S6, S2, S3, and S8. Thus, to generate the resultant address space, the fifth address space 430*e*, the program code updates the M and S value in the address designated L4. Below are the resulting contents of the fifth address space 430*e* after the program code has executed (but not committed), as indicated by the log file 460, transaction T5.

L1 M5 S5
L2 M2 S2
L3 M3 S3
L4 M8 S8

As indicated in the third address space 430*c*, the first address, originally L1 M5 S5, was updated in the fourth address space 430*d* to L1 M7 S7, so the fourth address space contains the most recent data related to this address. Meanwhile, the fourth address in the third address space 430*c*, originally L4 M6 S6, was updated by the fifth address space, to L4 M8 S8, so the fifth address space contains the most recent data related to this address.

FIG. 5 is a snapshot taken after the program code has committed the fourth address space 530*d* (e.g., FIG. 4, 430*d*). Thus, the fourth address space 530*d* is the newest committed address space and will be the parent address space that the program code will clone when opening a new transaction. At demonstrated in the log file 560, at time T8/t8, the program code committed the fourth transaction T4 as well as the memory mapped file, File 4. To commit the fourth transaction, T4, the program code references the most current cloned address space, the fifth address space 530*e*, and the memory mapped file for transaction T4, File 4. Referencing the memory mapped file, File 4, shows the program code that the address beginning L4 was updated since T4 was executed (by transaction T5). Thus, the memory mapped file, File 4, with the timestamp of t8, the same timestamp as when the program code committed transaction T4, is relevant to the current state of the database. Upon the program code committing the fourth address space 530*d*, this address space becomes the newest current address space. As seen in the log file 560, upon committing the transaction T4, the program code performed an atomic (serialized) operation to append a file name (e.g., File 4)

with the transaction (e.g., T4) start and/or transaction end time stamps (e.g., T8), to log file.

The transactions in FIGS. 3-5 are read-write transactions. Aspects of some embodiments of the present invention also provide for the generation of read-only transactions. For example, in an embodiment of the present invention, program code starts a read-only transaction with a new thread of address space with the latest commit state.

Figure 6:
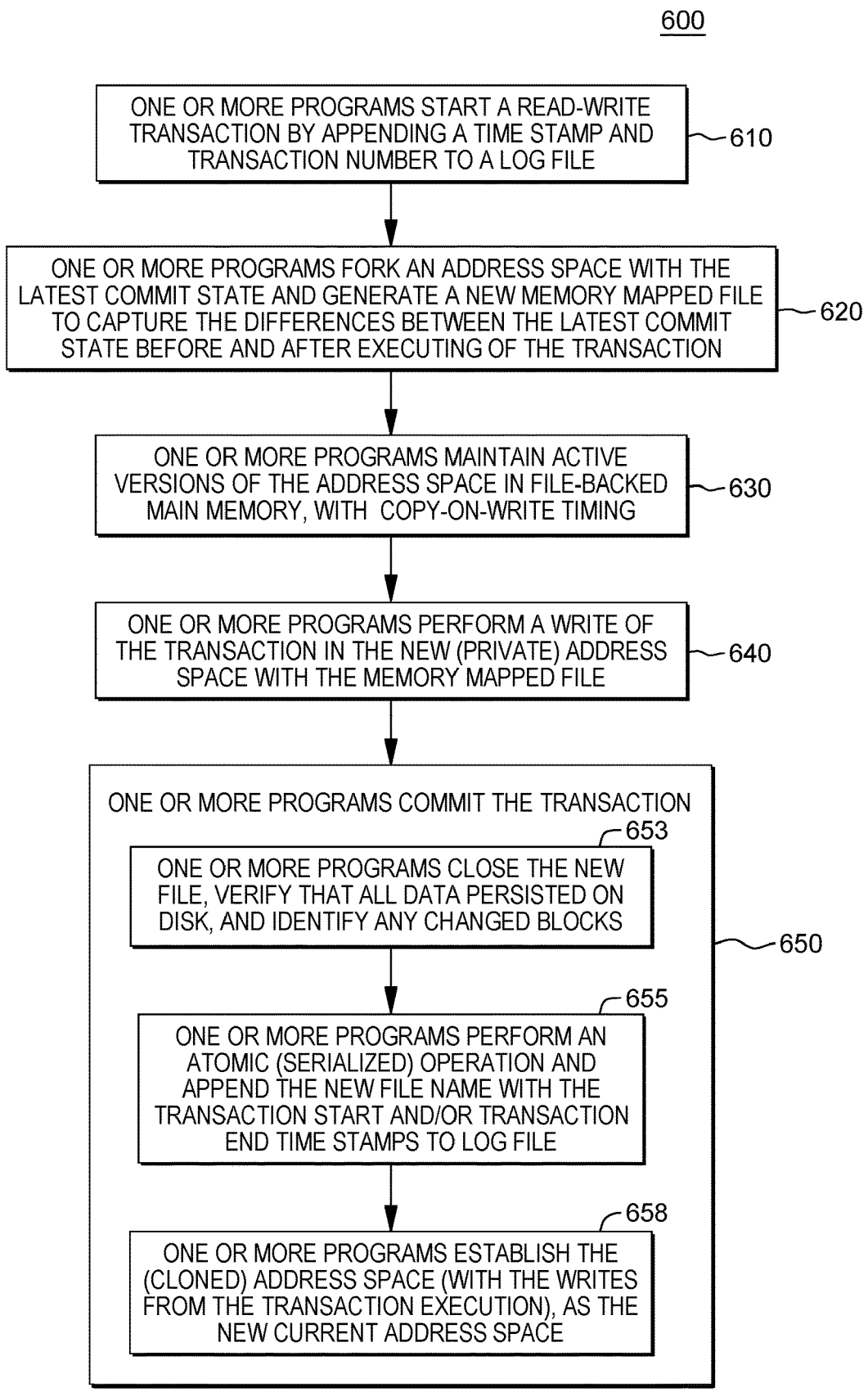
FIG. 6 depicts a workflow that includes various aspects of a data request in some embodiments of the present invention.

FIG. 6 provides a more detailed workflow 600 of various aspects of some embodiments of the present invention. In an embodiment of the present invention, the program code starts a read-write transaction by appending a time stamp and transaction number to a log file (610) (e.g., FIG. 4, 460, "T6: BOT T4"). The program code forks the address space with the latest commit state and generates a new memory mapped file to capture the differences between the latest commit state before and after executing of the transaction (620). In another embodiment of the present invention, rather than generate a new file for each transaction, the program code compresses deltas (between transactions) in a special file system, for performance optimization.

In some embodiments of the present invention, the program code maintains active versions of the address space in file-backed main memory, with copy-on-write timing (630). The program code may utilize a number of different approaches to copy-on-write in order to maintain data integrity, as the pages can be dirty. In some embodiments of the present invention, the program code makes a note on a changed memory block and perform a conflict check when committing the transaction. The program code may also utilize a traditional two phase lock (2PL) approach and lock the block that is to be updated in the current address space-related data structure. The program code can wait if an exclusive lock is not available. The program code may also rely on MVCC semantics, which do not require utilizing a log file and may additionally check for cycles at commit time in order to diminish the possibility of potential inconsistencies.

In an embodiment of the present invention, the program code performs a write of the transaction in the new (private) address space with the memory mapped file (640). The program code commits the transaction (650). As discussed above and illustrated in the FIGS. 3-5, the program code may commit a transaction immediately after writing it, or at some future time. As part of committing the transaction, based on the program code writing something to disk when committing the transaction, the program code closes the new file, verifies that all data persisted on disk, and identifies any changed blocks (653). The program code then performs an atomic (serialized) operation and appends the new file name with the transaction start and/or transaction end time stamps to log file (655). The program code establishes the (cloned) address space (with the writes from the transaction execution), as the new current address space (658). The new address space is provided with special treatment if multiple blocks have been updated concurrently.

Among the advantages of aspects of various embodiments of the present invention are the simplicity with which certain basic activities can be accomplished. In response to obtaining an instruction to roll back the transaction, the program code discards the memory mapped file and the (cloned) address space (not pictured). Embodiments of the present invention simplify recovery to the latest consistent state of the database. To recover to a latest consistent state, the program code reads the latest file using a memory-mapped file I/O. To initiate a point-in-time recovery or a transaction restart, the program code identifies a related file name for that point or transaction in time in log file. The program code reads the identified file using a memory-mapped file I/O. Aspects of some embodiments of the present invention also simplify the creation of a backup or a snapshot of the database. To create a backup or snapshot, the program code duplicates a file, copying all referenced blocks for the backup and using copy-on-write to generate a snapshot. As illustrated in FIG. 6, a transaction being left in an uncommitted/open state does not interfere with other transactions being started afterwards. In some embodiments of the present invention, one or more programs could page out a not-committed transaction completely to archive storage and continue working on it later, even a few months later (e.g., after a user working with a special report continues that work), by just re-loading the persistent address space because no later address space depends on it.

Embodiments of the present invention include a computer-implemented method, a computer program product, and a computer system for processing database transactions. Some embodiments of the present invention include one or more programs initiating a database transaction, in a computing environment that include a database that includes one or more memory devices. Initiating the transaction includes the one or more programs forking a first address space, where the first address space is an address space representing a current state of the database, to create a second address space. The one or more programs write an entry indicating timing of the initiating to a log file. The one or more programs generate a file, where the file is mapped to the one or more memory devices. The file includes: 1) differences in state between the current state of the database and a state subsequent to executing; and 2) committing the database transaction and a timestamp indicating timing for committing the database transaction. The file maps a state of the database comprising one or more temporary modifications implemented by the database transaction and a timestamp indicating timing for committing the database transaction. The one or more programs write the database transaction to the second address space.

In some embodiments of the present invention the one or more programs utilize copy-on-write timing, to maintain the address space and the second address space.

In some embodiments of the present invention, the one or more programs commit the database transaction to the one or more memories, which includes the one or more programs writing data to the one or more memory devices. The one or more programs append the log file with an identifier of the file and a timestamp; the timestamp represent the transaction start time or end time. The one or more programs replace the first address space with the second address space, where based on the replacing, the second address space is the address space representing the current state of the database.

In some embodiments of the present invention, the one or more programs initiate a new database transaction, which includes the one or more programs forking the second address space to create a third address space. The one or more programs write a new entry indicating timing of the initiating to a log file. The one or more programs generate a new file; the new file is mapped to the one or more memory devices. The new file includes: 1) differences in state between the current state of the database and a state subsequent to executing and committing the new database transaction; and 2) a new timestamp indicating timing for committing the new database transaction. The file maps a new state of the database comprising one or more temporary modifications implemented by the new database transaction and a new timestamp indicating timing for committing the new database transaction. The one or more programs write the new database transaction to the third address space.

In some embodiments of the present invention, the one or more programs restore the current state to a given point-in-time, with the given point-in-time being represented by the timestamp. The one or more programs access the log file to identify a record with the timestamp, where the record includes the identifier of the file. The one or more programs read the file utilizing a memory mapped input/output device to determine differences between the current state and a state at the given point-in-time. The one or more programs execute one or more transactions, to restore the current state to the state at the given point-in-time.

In some embodiments of the present invention, the one or more programs utilize the file to verify that the data persisted in the one or more memories. The one or more programs also identify any changes blocks in the one or more memories.

In some embodiments of the present invention, the one or more programs receive an instruction to roll back the transaction. The one or more programs discard the second address space and the file.

In some embodiments of the present invention, the one or more programs recover a latest consistent state of the database, which includes the one or more programs reading the file utilizing a memory mapped input/output device to determine differences between the current state and a state reflected in the file. The recovering also includes the one or more programs executing one or more transactions, to restore the current state to the state a state reflected in the file.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, elements of the technical environment of FIG. 2, can be understood as cloud computing node 10 (FIG. 7) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
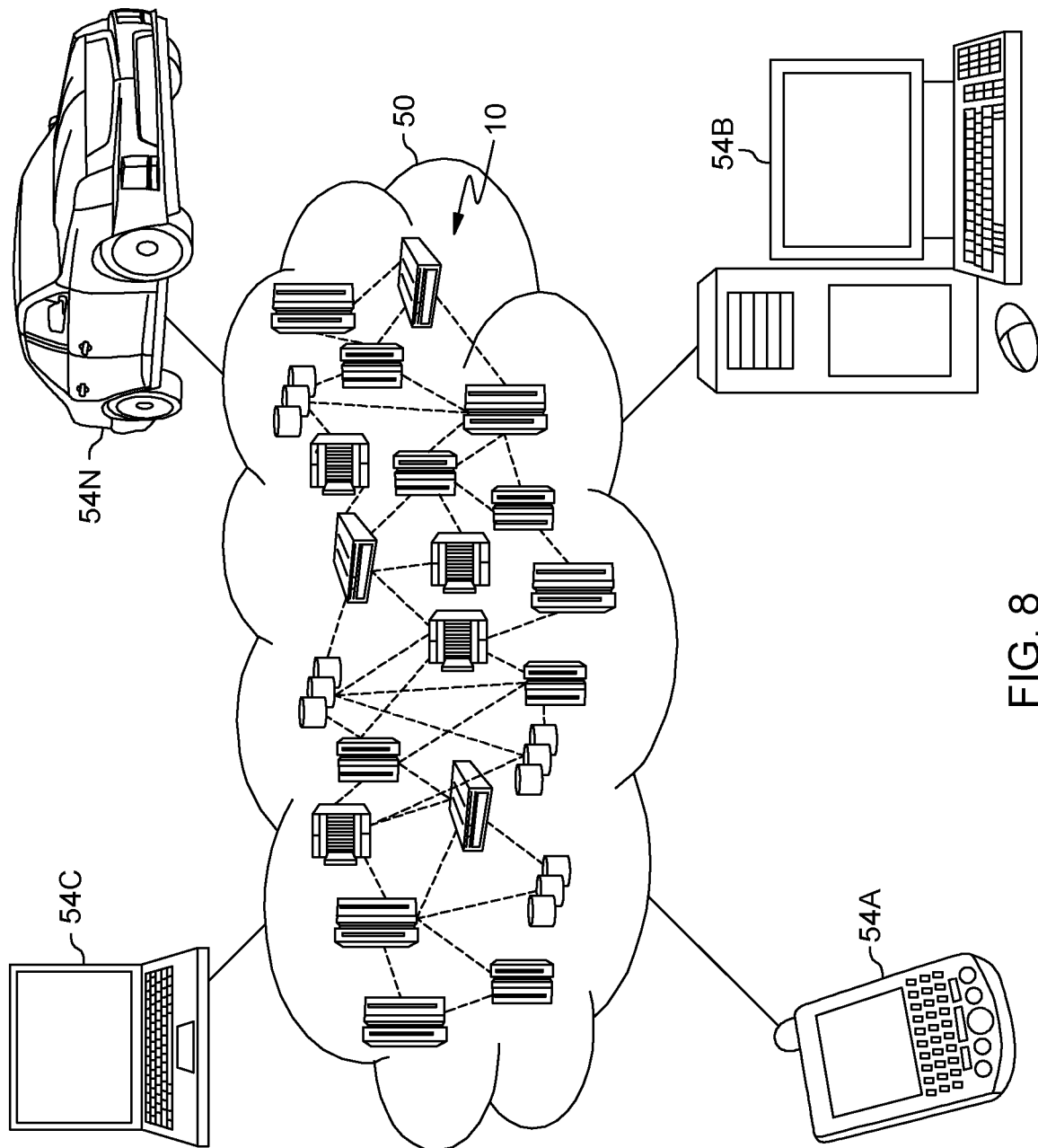
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
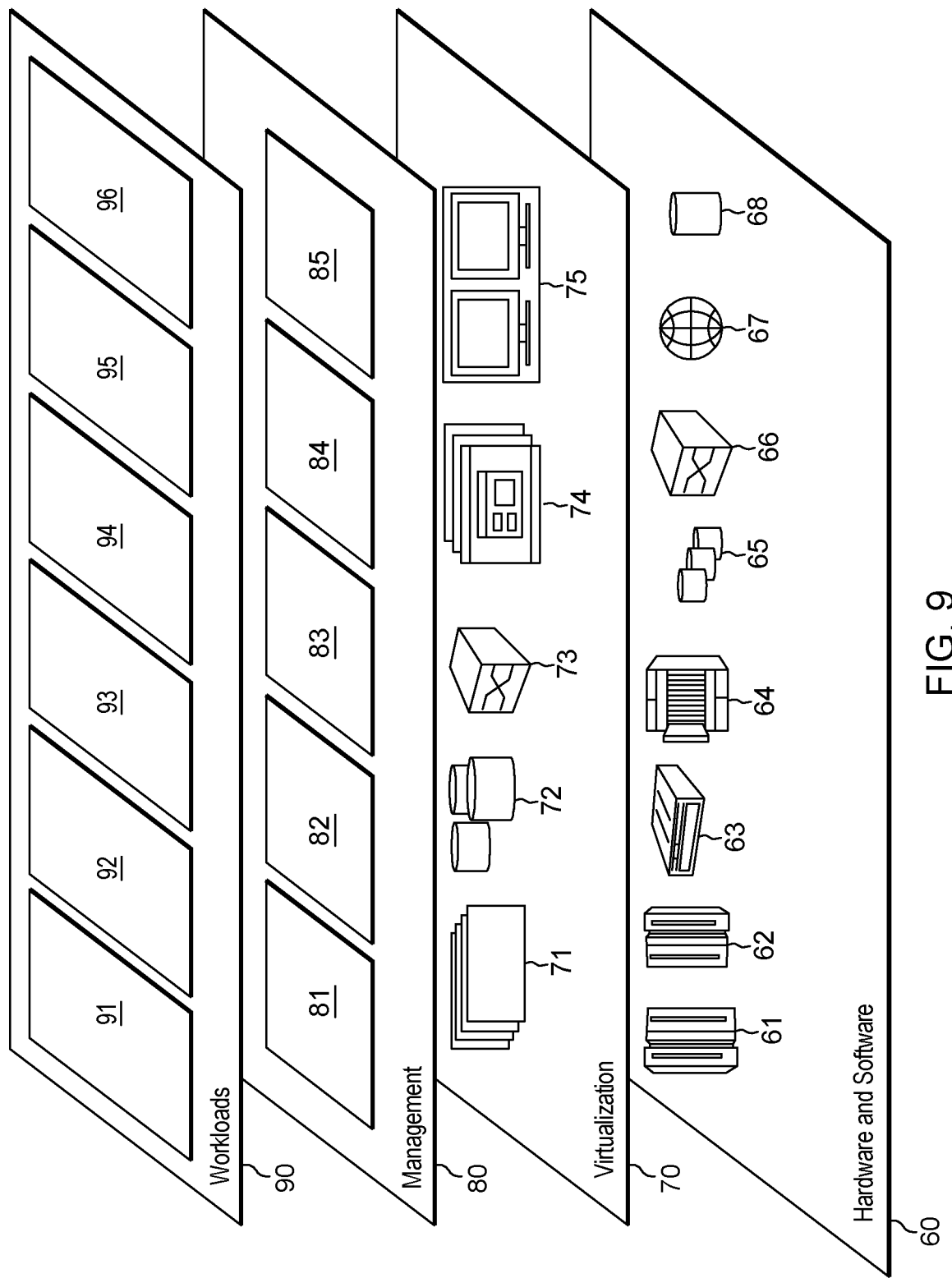
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing transactions in a database 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
maintaining, by one or more processors, a current version of at least a part of a database in a file associated with a mass storage device, wherein the file comprises content;
mapping, by the one or more processors, at least a portion of the content of the file to an address region;
obtaining, by the one or more processors, a command to open a new transaction;
based on obtaining the command, generating, by the one or more processors, a cloned version of the address region; and
mapping, by the one or more processors, one or more files associated with the mass storage device comprising the database to the clones version of the address region.

2. The computer-implemented method of claim 1, further comprising:
obtaining, by the one or more processors, a commit command;
based on obtaining the commit command, determining, by the one or more processors, that the cloned version of the address region and the mapped one or more files reflect a new current of the at least part of the database.

3. The computer-implemented method of claim 1, further comprising:
obtaining, by the one or more processors, a rollback command.

4. The computer-implemented method of claim 3, further comprising:
based on obtaining the rollback command, discarding, by the one or more processors, the cloned version of the address region and the one or more files associated with the mass storage device.

5. The computer-implemented method of claim 1, wherein the address region comprises a processor address region.

6. The computer-implemented method of claim 1, wherein mapping the one or more files comprises mapping a current state of the database.

7. The computer-implemented method of claim 1, wherein the state of the database comprises all temporary modifications done by transactions owning the address region.

8. The computer-implemented method of claim 1, wherein each mapped file of the one or more mapped files represents the address region from a perspective of a transaction.

9. The computer-implemented method of claim 1, wherein persistent storage comprises the address region.

10. A computer program product comprising:
a computer readable storage medium readable by one or more processors and storing instructions for execution by the one or more processors for performing a method comprising:
maintaining, by the one or more processors, a current version of at least a part of a database in a file associated with a mass storage device, wherein the file comprises content;
mapping, by the one or more processors, at least a portion of the content of the file to an address region;
obtaining, by the one or more processors, a command to open a new transaction;
based on obtaining the command, generating, by the one or more processors, a cloned version of the address region; and mapping, by the one or more processors, one or more files associated with the mass storage device comprising the database to the clones version of the address region.

11. The computer program product of claim 10, further comprising:
obtaining, by the one or more processors, a commit command;
based on obtaining the commit command, determining, by the one or more processors, that the cloned version of the address region and the mapped one or more files reflect a new current of the at least part of the database.

12. The computer program product of claim 10, further comprising:
obtaining, by the one or more processors, a rollback command.

13. The computer program product of claim 12, further comprising:
based on obtaining the rollback command, discarding, by the one or more processors, the cloned version of the address region and the one or more files associated with the mass storage device.

14. The computer program product of claim 10, wherein the address region comprises a processor address region.

15. The c computer program product of claim 10, wherein mapping the one or more files comprises mapping a current state of the database.

16. The computer program product of claim 10, wherein the state of the database comprises all temporary modifications done by transactions owning the address region.

17. The computer program product of claim 10, wherein each mapped file of the one or more mapped files represents the address region from a perspective of a transaction.

18. A system comprising:
one or more memories;
one or more processors in communication with the one or more memories; and
program instructions executable by the one or more processors via the one or more memories to perform a method, the method comprising:

a computer readable storage medium readable by one or more processors and storing instructions for execution by the one or more processors for performing a method comprising:
maintaining, by the one or more processors, a current version of at least a part of a database in a file associated with a mass storage device, wherein the file comprises content;
mapping, by the one or more processors, at least a portion of the content of the file to an address region;
obtaining, by the one or more processors, a command to open a new transaction;
based on obtaining the command, generating, by the one or more processors, a cloned version of the address region; and
mapping, by the one or more processors, one or more files associated with the mass storage device comprising the database to the clones version of the address region.

19. The system of claim 18, the method further comprising:
obtaining, by the one or more processors, a commit command;
based on obtaining the commit command, determining, by the one or more processors, that the cloned version of the address region and the mapped one or more files reflect a new current of the at least part of the database.

20. The system of claim 18, the method further comprising:
obtaining, by the one or more processors, a rollback command; and
based on obtaining the rollback command, discarding, by the one or more processors, the cloned version of the address region and the one or more files associated with the mass storage device.

* * * * *